United States Patent [19]
Schilling

[11] Patent Number: 5,319,941
[45] Date of Patent: Jun. 14, 1994

[54] SYSTEM AND METHOD FOR STORING PERISHABLE PRODUCTS IN A REFRIGERATED CARGO BAY

[75] Inventor: Richard L. Schilling, Garden City, Kans.

[73] Assignee: Trans-Pak, Inc., Garden City, Kans.

[21] Appl. No.: 949,420

[22] Filed: Sep. 22, 1992

[51] Int. Cl.$^5$ .............................................. B60H 1/32
[52] U.S. Cl. .......................................... 62/89; 34/487; 62/239; 108/51.3; 454/91
[58] Field of Search ....................... 62/239, 89; 454/90, 454/91, 92; 108/51.1, 51.3; 34/34

[56] References Cited

U.S. PATENT DOCUMENTS

| | | | |
|---|---|---|---|
| 1,844,034 | 11/1931 | Parker | 454/91 X |
| 1,869,683 | 8/1932 | Grayson | 62/239 X |
| 2,507,588 | 5/1950 | Brandon et al. | 248/120 |
| 2,888,221 | 5/1959 | Connelly | 248/120 |
| 2,970,797 | 2/1961 | Desbois | 248/120 |
| 3,407,758 | 10/1968 | Simkins | 108/51.3 |
| 3,683,823 | 8/1972 | Schmid | 108/156 |
| 4,228,744 | 10/1980 | Moore | 108/51.3 |
| 4,966,084 | 10/1990 | Motomaru | 108/51.3 |
| 5,101,643 | 4/1992 | Hicke | 108/51.1 X |

Primary Examiner—William E. Tapolcai
Attorney, Agent, or Firm—Senniger, Powers, Leavitt & Roedel

[57] ABSTRACT

A refrigerated cargo bay such as a cargo bay of a refrigerated cargo transport in combination with a plurality of generally rectangular product support platforms. The product support platforms each have a generally rectangular upper panel and a plurality of spacers depending from the upper panel for spacing the upper panel from the floor of the cargo bay. The spacers are arranged in spaced apart locations and define passageways for air beneath the upper panel and above the floor between all of the four sides of the platform to permit the flow of air into any one of the sides between the upper panel and the floor and out all three of the other sides of the platform. The platforms are arranged in a side-by-side relationship on the floor of the cargo bay with adjacent sides of the platforms generally in engagement with one another such that air is permitted to flow under the upper panels between all platforms in substantially all directions parallel to the floor.

17 Claims, 7 Drawing Sheets

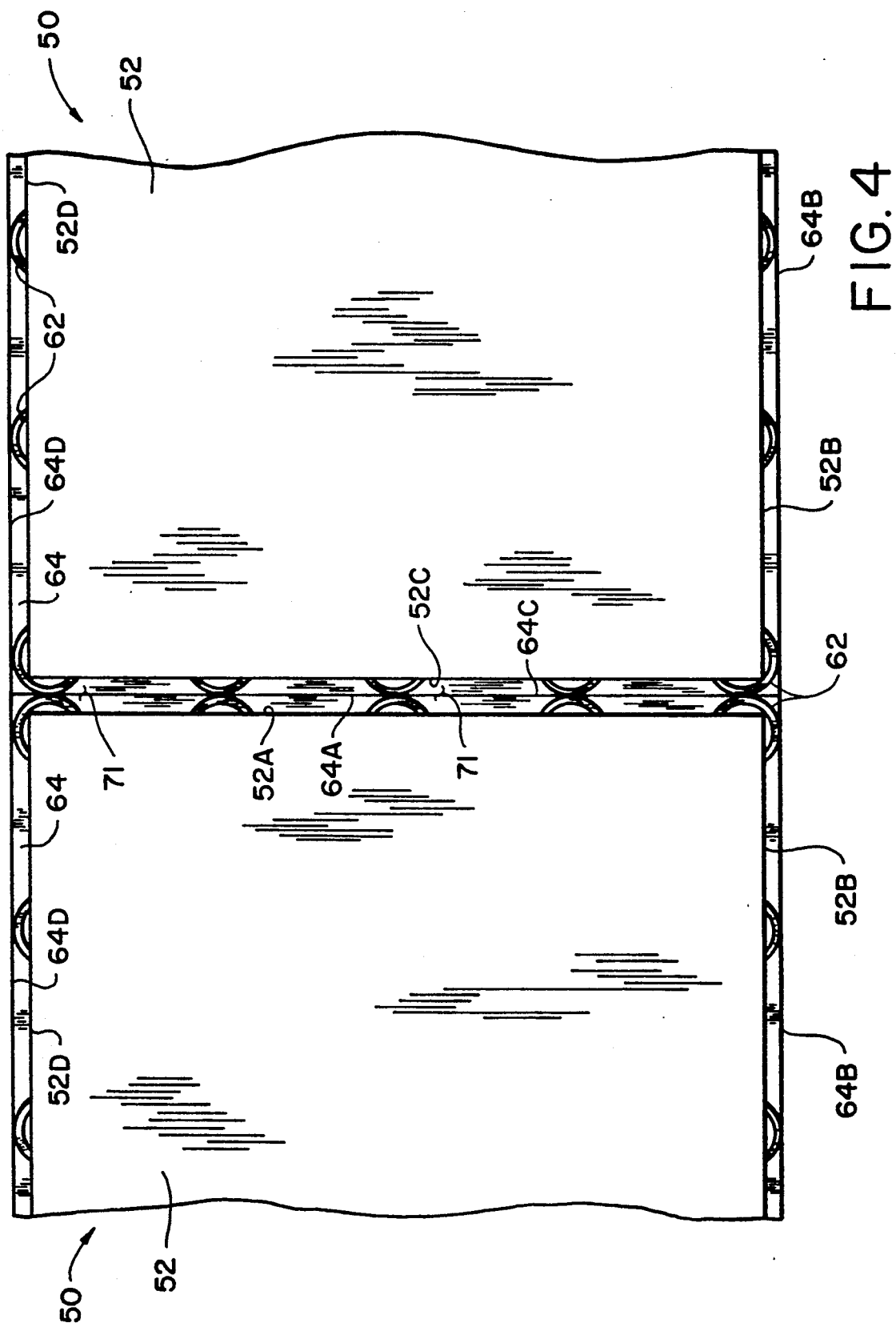

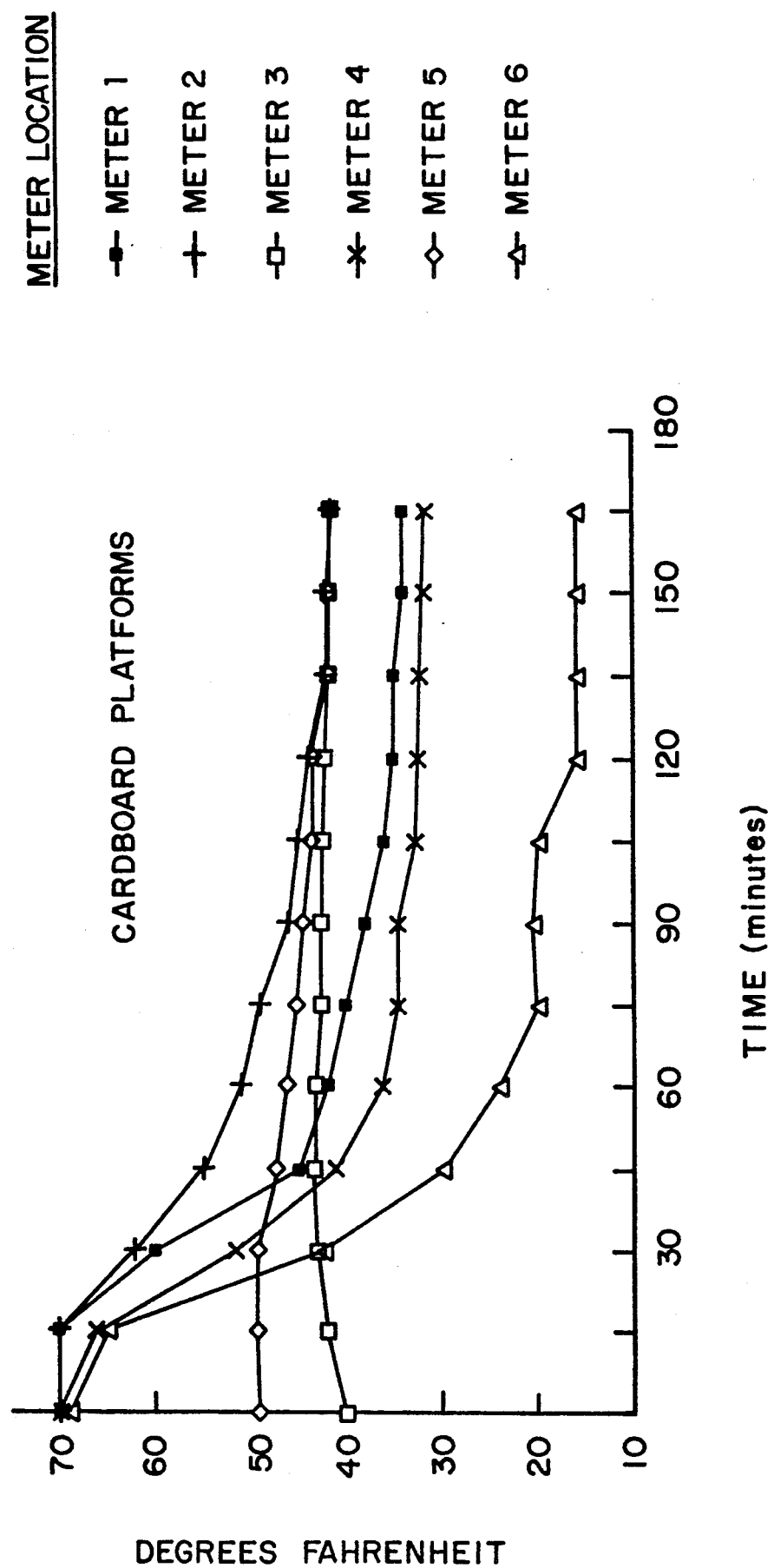

SYSTEM AND METHOD FOR STORING PERISHABLE PRODUCTS IN A REFRIGERATED CARGO BAY

SUMMARY OF THE INVENTION

This invention relates generally to the storage of perishable products in refrigerated cargo bays and more specifically to a system and method for loading perishable product in a refrigerated cargo bay.

Perishable products (e.g., meat) are frequently transported in the refrigerated semitrailer of a tractor-trailer. When the product is to be in the semitrailer for several days, it is stacked on standard wooden pallets on the floor of the semitrailer. The pallets have an upper surface on which the product rests, which is made up of spaced apart wooden slats. Runners extend down from the slats on opposite sides of the pallet and space the upper surface from the floor of the semitrailer. The bottom of the pallet is either completely open or has a surface of spaced apart slats like the upper surface. The refrigerated semitrailer has a refrigeration unit at its forward end (i.e., adjacent to the tractor) which cools and circulates air in the semitrailer. The refrigeration unit forces cooled air from the front of the semitrailer rearwardly in a duct over the top of the stacks of product. The air is drawn forwardly over the stacks of product and under the pallets to an air return of the refrigeration unit located at the forward end of the semitrailer.

Presently, there is a substantial occurrence of spoilage of product at the bottom of the stacks on the pallets, particularly when the ambient temperature outside the semitrailer is high. Spoilage of the product on the bottom is believed to be caused by, among other things, heat transfer through the floor, which can be substantial on hot roads in the summer. The bottoms of wooden pallets, which are open or have only spaced apart slats, provide little protection against heat transfer from the floor. Failure of the refrigerated air to be adequately circulated under the product is also believed to be a substantial factor in spoilage. The runners of the pallets, which must be turned to extend transversely of the lengthwise extension of the semitrailer to fit in the semitrailer, substantially block the flow of air from rear to front of the semitrailer under the product.

Thus, there is presently a need for a system and method for loading perishable product in a refrigerated cargo bay of a cargo transport, such as a refrigerated semitrailer, which can reduce or prevent spoilage of product loaded in the transport.

Among the several objects and features of the Present invention may be noted the provision of a system and method for loading perishable product in a refrigerated cargo bay which prevents spoilage of the product; the provision of such a system and method which permits the flow of air both lengthwise and widthwise of the cargo bay under the product and facilitates circulation of the air through the cargo bay; the provision of such a system and method which insulates the product from heat transfer through the floor of the cargo bay; the provision of such a system which enhances convective heat transfer from the product to the circulating air by introducing turbulence into the flow; the provision of such a system and method which make loading of the product less hazardous; and the provision of such a system and method which are inexpensive and employ components which are strong, lightweight and easy to manufacture.

Generally, in combination, a refrigerated cargo bay such as a cargo bay of a refrigerated cargo transport and a plurality of generally rectangular product support platforms. The cargo bay has a floor for supporting cargo thereon and a refrigeration unit for cooling and circulating air through the cargo bay. The product support platforms each comprise a generally rectangular upper panel and a plurality of spacers depending from the upper panel for spacing the upper panel from the floor of the cargo bay. The spacers are arranged in spaced apart locations and define passageways for air beneath the upper panel and above the floor between all of the four sides of the platform to permit the flow of air into any one of the sides between the upper panel and the floor and out all three of the other sides of the platform. The platforms are arranged in a side-by-side relationship on the floor of the cargo bay with adjacent sides of the platforms generally in engagement with one another such that air is permitted to flow under the upper panels between all Platforms in substantially all directions parallel to the floor. The platforms are adapted to insulate the product supported thereon from the floor of the cargo bay.

A method of the present invention is directed to loading and cooling a perishable product which must be maintained at a cooled temperature in a refrigerated cargo bay having a floor, spaced apart side walls projecting upwardly from the floor and extending between a forward end and a rearward end of the cargo bay, and a refrigeration unit for cooling and circulating air through the cargo bay. Generally, the method includes the steps of providing a plurality of product support platforms comprising a generally rectangular upper panel, a plurality of spacers depending from the upper panel for spacing the upper panel from the floor of the cargo bay. The spacers are arranged in spaced apart locations and defining passageways for air beneath the upper panel and above the floor between all of the four sides of the platform to permit the flow of air into any one of the sides between the upper panel and the floor and out all three of the other sides of the platform. The platforms are arranged in a side-by-side relationship on the floor of the cargo bay with adjacent sides of the platforms generally in engagement with one another whereby air is permitted to flow under the upper panels between all platforms in substantially all directions lying in a plane parallel to the floor. The product is loaded onto the platforms, whereby cooled air from the refrigeration unit is permitted to flow between the upper panels and the floor in any direction.

Other objects and features of the present invention will be in part apparent and in part pointed out hereinafter.

BRIEF DESCRIPTION OF THE DRAWINGS

FIG. 4 is a plan view of two platforms as arranged on the semitrailer floor;

FIG. 5 is a plot of the results of a test conducted for product loaded on platforms according to the present invention;

Corresponding reference characters indicate corresponding parts throughout the several views of the drawings.

DETAILED DESCRIPTION OF THE PREFERRED EMBODIMENT

Figure 1:
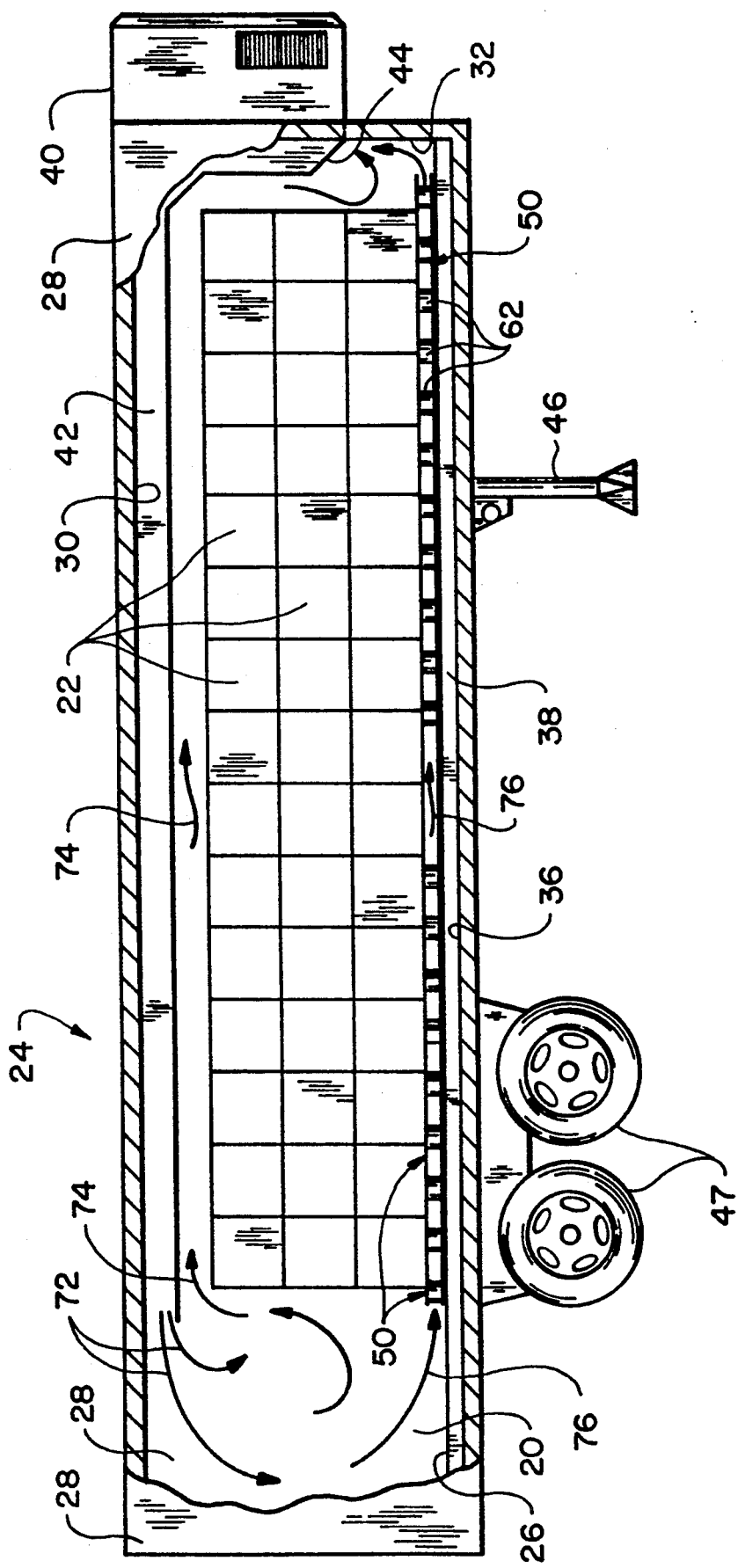
FIG. 1 is a schematic side elevation of a refrigerated semitrailer with its side broken away to show perishable product loaded on platforms.

A semitrailer having a refrigerated cargo bay 20 loaded with boxes 22 of perishable product (not shown) according to the method of the present invention is generally indicated at 24 in the drawings. The semitrailer 24 includes a floor 26, and laterally spaced apart side walls 28 projecting upwardly from the floor to a roof 30 and extending between a front wall 32 and a back wall 34. The side walls 28, floor 26, front wall 32, back wall 34 and roof 30 enclose the cargo bay 20. The floor 26 is made of aluminum and spaced from the semitrailer bed 36 to form an air return duct 38.

A refrigeration unit 40 mounted on the front wall 32 of the semitrailer 24 cools air and forces it rearwardly in a duct 42 along the roof 30 in the cargo bay 20. An air return 44 communicating with the cargo bay 20 is disposed generally at the lower end of the refrigeration unit 40 for receiving air circulated through the cargo bay for recooling. The semitrailer 24 is shown as parked with its front end supported by landing gear 46, but the semitrailer may be hitched to a tractor (not shown) and rolled on its wheels 47 for transporting the semitrailer and its cargo. It is to be understood that the semitrailer 24 is only an illustrative cargo transport, and that the invention is applicable to loading product 22 in other structures having cargo bays.

Figure 3:
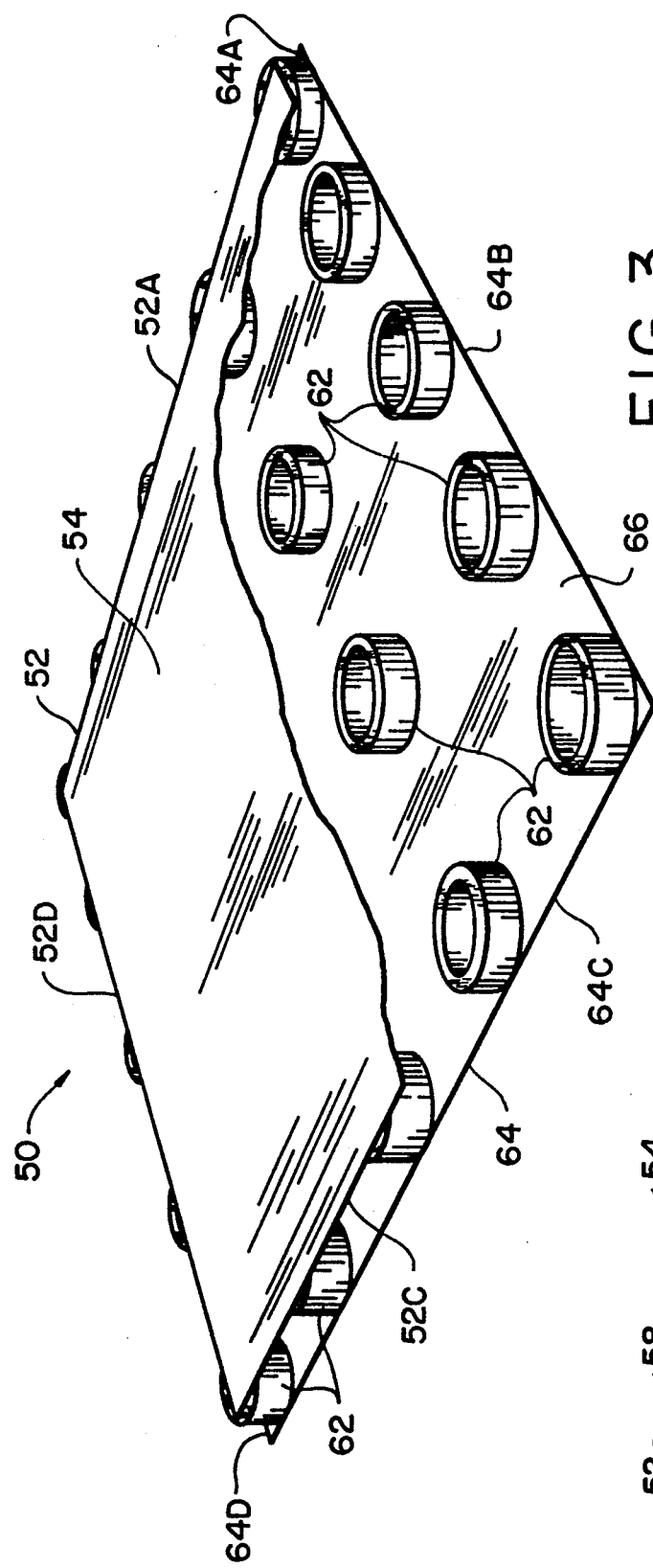
FIG. 3 is a perspective of one of the platforms with parts of its upper panel broken away to show details.
Figure 3A:
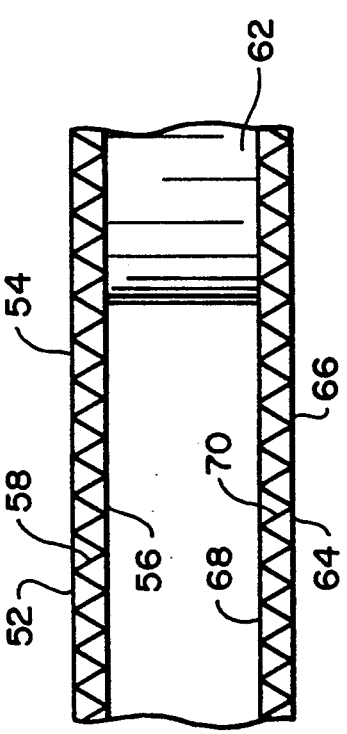
FIG. 3A is an enlarged fragmentary elevation of the platform of FIG. 3.

The boxes 22 of perishable product are stacked on product support platforms, generally indicated at 50, which have been arranged on the floor 26 of the cargo bay. As shown in FIG. 3, each platform 50 is generally rectangular in shape. In the illustrated embodiment, the platform 50 is about 42 inches wide, 48 inches long and 1.75 inches deep, so that the platform has about the same surface area for supporting product as a standard wooden pallet, but is not as deep. Of course, the platform 50 may have dimensions other than these and still fall within the scope of the present invention. A upper panel 52 of the platform is generally rectangular and has four peripheral edge margins, designated 52A, 52B, 52C and 52D, respectively. The upper panel 52 is preferably made of a cardboard sheet of standard construction having a solid outer face 54, a solid inner face 56 and a corrugated middle liner 58 sandwiched between the outer face and the inner face. The cardboard preferably has a 26 pound or greater weight liner for strength.

A plurality of generally tubular spacers 62 depend from the upper panel 52 of each platform 50 and extend to a lower panel 64 of the platform. The lower panel 64 is rectangular in shape and has four peripheral edge margins, designated 64A, 64B, 64C and 64D, respectively. The lower panel 64 is made of a cardboard sheet like the upper panel 52, having an outer face 66, an inner face 68 and a corrugated middle liner 70. The cardboard used for the lower panel 64 also has a 26 pound liner.

The lower panel 64 has a greater surface area than the upper panel 52, and the upper and lower panels are positioned relative to one another so that the peripheral edge margins 64A–64D of the lower panel extend laterally outwardly from under the corresponding peripheral edge margins 52A–52D of the upper panel. Thus, as shown in FIG. 4, when side edge margins 64A and 64C of the lower panels 64 of adjacent platforms 50 abut each other, the adjacent side edge margins 52A, 52C of the upper panel 52 are spaced apart by a gap 71. As described more fully hereinafter, the gap permits air to flow downwardly from between to the boxes 22 the upper and lower panels 52, 64 of the platforms for cooling the product.

Figure 2:
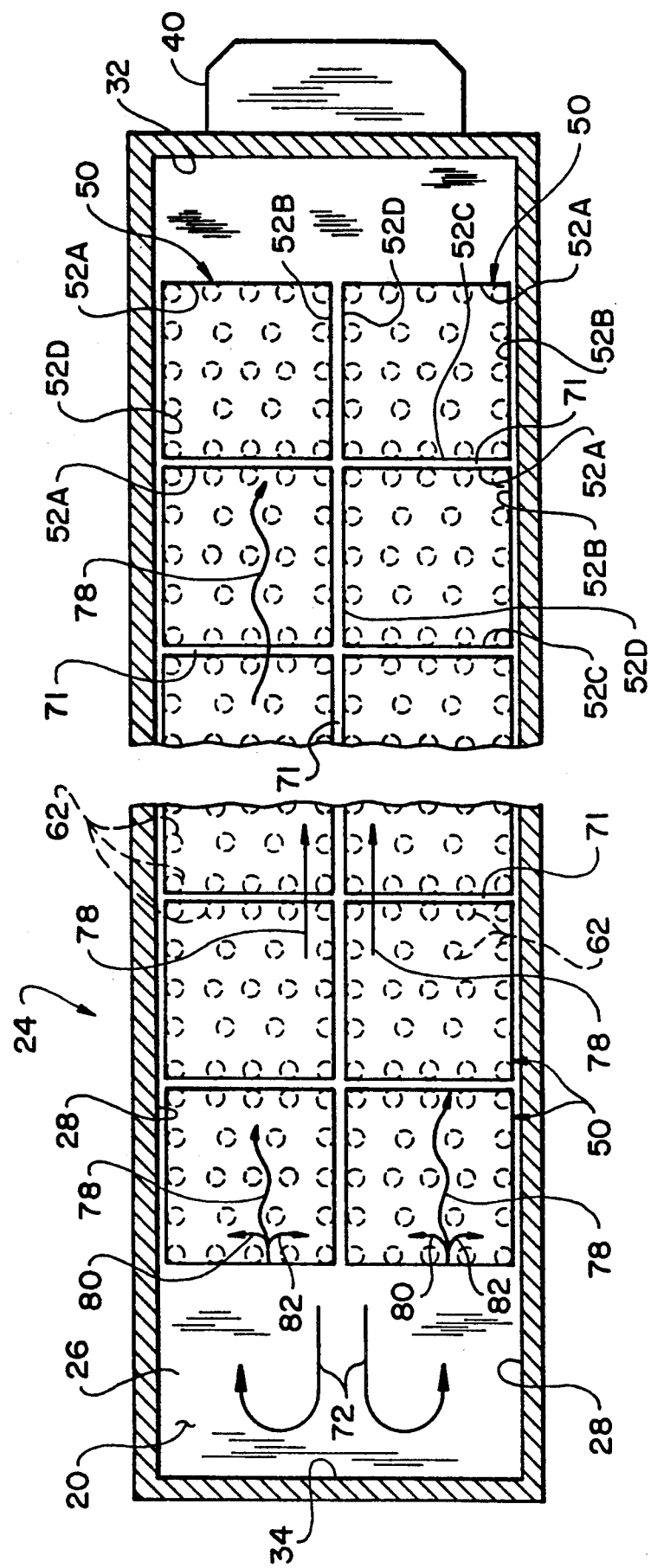
FIG. 2 is a fragmentary horizontal section of the semitrailer, but with the product removed to show details of the platforms.

The spacers 62 are made of cardboard and are attached at respective ends as by gluing to the inner faces 56, 68 of the upper panel 52 and the lower panel 64 for interconnecting the upper panel and the lower panel. As shown in FIG. 2, the spacers 62 are arranged in five rows which are parallel to two opposite sides of the platform 50. The number of spacers 62 alternates between 5 and 4 so that adjacent rows have unequal numbers of spacers. The spacers 62 provide sufficient reinforcement to the upper panel 52 to permit the platform to support substantial loads of product 22 and to allow workmen to walk on the platforms without damaging them. In addition, the arrangement of the spacers 62 defines passageways between the upper and lower panels 52, 64 for air, and places all four sides of the platform 50 in fluid communication with each other so that air may flow into any one of the four sides of the platform and out of any of the other three sides. The location of the spacers creates continuous, but tortuous passageways for the air as it travels generally forwardly under the upper panel 52. As the air flows past the curved outer surfaces of the spacers 62, turbulence is set up in the flow creating eddies and currents which enhance convective heat transfer from the product to the circulating air.

The method of the present invention includes the step of providing a plurality of platforms 50 as previously described. The platforms 50 are arranged in side-by-side relationship on the floor 26 of the cargo bay 20 with adjacent edge margins (e.g., edge margins 64A and 64C of adjacent platforms 50 shown in FIG. 4) of the lower panels 64 of the platforms engaging each other. As arranged on the semitrailer 24, the lower panels 64 form a substantially continuous bottom surface over the floor 26 of the semitrailer. The cardboard in the lower panel 64 provides some insulation against the transfer of heat through the floor to the product 22. The construction of the platform 50 permits air to flow under the upper panels between all platforms in substantially all directions lying in a plane parallel to the floor.

Loading of the perishable product (e.g., meat) is facilitated by the substantially solid surface formed by the upper panels 52 on the floor 26 because there are no large openings (i.e., as between slats in an ordinary wooden pallet) in which a workman loading the truck might catch his foot. The gaps 71 between upper panels 52 of adjacent platforms are preferably on the order of 1 inch so that the workman should be able to walk over the gap without catching his foot.

The refrigeration unit 40 forces cooled air rearwardly of the semitrailer 24 through the duct 42 and out into the cargo bay 20 as indicated by arrows 72 in FIGS. 1 and 2. The air is drawn forwardly by the refrigeration unit 40 so that the air passes over the stack of product (arrows 74), into the duct 38 under the floor 26 of the semitrailer 24, and between the upper panels 52 and lower panels 64 of the rearwardmost platforms 50 in the cargo bay (arrows 76). The gaps 71 between adjacent side edge margins 52A–52D of the upper panels 52 also permit air to flow downwardly from between the product 22 to the upper and lower panels of the platforms 50. The arrangement of the spacers 62 allows the air to flow forwardly along tortuous but continuous paths. As may be seen in FIG. 2, several continuous passageways (e.g., passageways 78) from the rear of the semitrailer 24 to its front are defined by the spacers 62. The spacers 62 are arranged to permit cooled air to enter on any side of any of the platforms 50, and thereafter to flow in (at least) the three directions indicated by arrows 78, 80 and 82, such that the air may flow laterally between platforms for uniform cooling from side to side of the semitrailer. The platforms 50 do not block the return flow of air to the refrigeration unit 40 to be recooled, but their spacers 62 create turbulence in the return flow which increases heat transfer from the product 22. The continuous flow of cool air also absorbs heat transmitted through the floor 26 and lower panels 64 of the platforms 50 to protect the product from heat when being transported over hot roads.

Tests have shown the system for and method of loading of the present invention produces superior cooling of the product 22 over conventional systems and methods. The tests were conducted using a 48 foot refrigerated semitrailer 24 with a one inch aluminum duct floor 26. The semitrailer 24 was inspected and not found to have any damage or defects which would create extraordinary air losses from its cargo bay 20. The semitrailer 24 was located in a room maintained at a generally constant temperature of 70 degrees (all temperature readings are in degrees Fahrenheit). In both tests, the inside of the semitrailer 24 was heated to 100 degrees with space heaters to simulate a hot trailer condition of the type which has been found to lead to spoilage of some of the product during transport. The semitrailer 24 was loaded in both tests in 30 minutes and the refrigeration unit 40, which was set at 28 degrees, was activated. Water balloons (not shown) chilled to a temperature of 34 degrees prior to loading were the product in the test.

Temperature meters (not shown) were placed in six locations in the cargo bay. The meters included two 0 to 70 degree Simpson meters with probes, three Fluke model 87 Digital Multimeters with temperature probes and one Fluke model 52 K/J Digital Thermometer (dual input) with probes. The meters were placed in the following locations for the test using the platforms 50 (and in corresponding locations for the test using wooden pallets): (1) between the upper panel 52 and lower panel 64 of the center platform at the front of the semitrailer; (2) in the duct 38 about midway between the front wall 32 and back wall 34 of the semitrailer 24; (3) in the product in a box 22 about midway between the front and rear of the stack of boxes in the semitrailer on the second level of the stack; (4) in the middle of the cargo bay 20 over the product; (5) in a box located on the bottom row about midway between the front and rear of the stack of boxes in the semitrailer; and (6) suspended about four feet above the floor 26 rearward of the stack and platforms at the rear of the semitrailer. The meters were read every 15 minutes for a period of three hours after loading.

Figure 6:
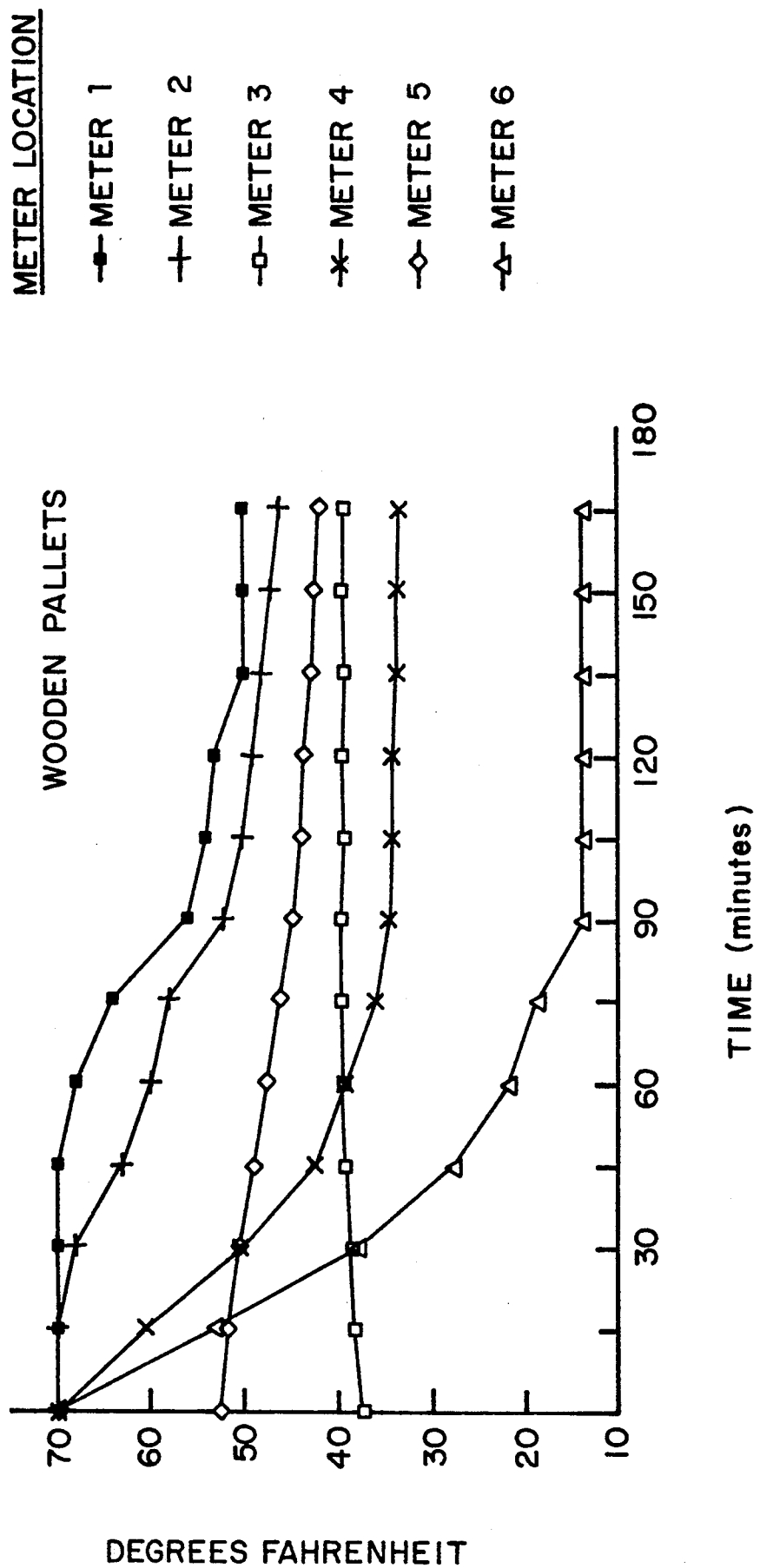
FIG. 6 is a plot of the results of a test conducted for product loaded on wooden pallets.
Figure 7:
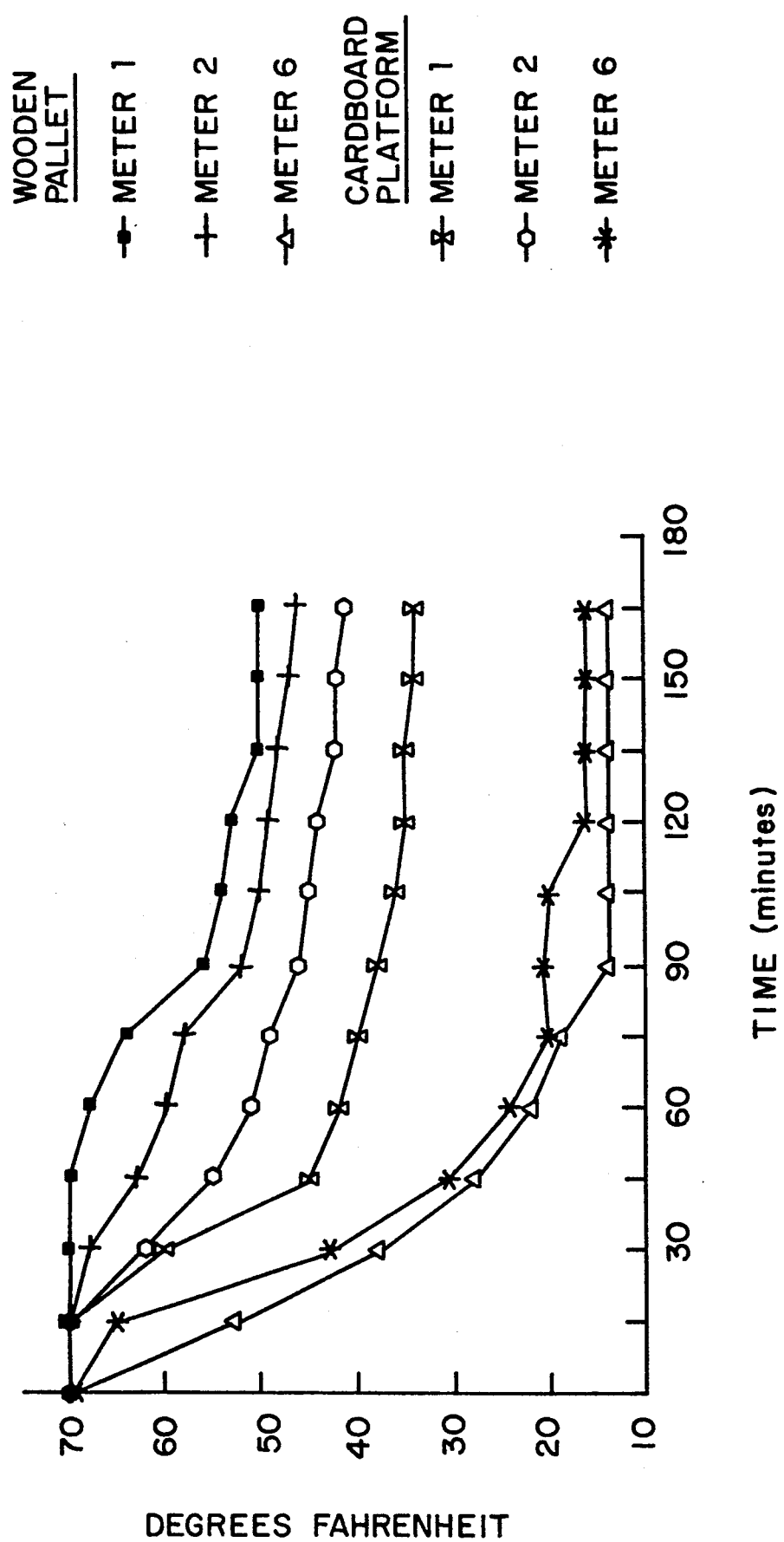
FIG. 7 is a comparative plot of selected results of the tests referred to in FIGS. 5 and 6.

The results of the test are graphically illustrated in FIGS. 5–7 of the drawings. FIG. 5 shows the results of the test using the method of the present invention (employing platforms 50), and FIG. 6 shows the results of the tests using standard wooden pallets (not shown). A comparative plot of some of the results from both tests is shown in FIG. 7.

As may be seen, when the product 22 was loaded according to the method of the present invention, better air flow and cooling was achieved. Notably, the temperature drop at the front of the semitrailer 24 (meter (1)) was much quicker and reached a lower temperature when the product was loaded on platforms 50 rather than the wooden pallets. A similar difference was found in the temperature on the floor midway between the front wall 32 and rear wall 34 of the semitrailer (meter (2)). The results show that the flow of cool air under the product 22 was significantly enhanced by the use of platforms 50. The product temperature increase was less in the test using the platforms 50, and the reduction in product temperature from the peak temperature was steadier than in the test using the standard pallets. The temperature of the air behind the product at the rear of the semitrailer 24 was colder in the test using the wooden pallets than in the test employing platforms 50. This result supports the conclusion that when wooden pallets are used, the cooled air tends to stagnate at the rear of the semitrailer 24 rather than flowing under and cooling the product. Thus, Perishable product loaded on platforms 50 is less likely to spoil when transported in hot weather.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In combination, a refrigerated cargo bay such as a cargo bay of a refrigerated cargo transport, the cargo bay comprising a sub-floor and a floor spaced from the sub-floor for supporting products thereon and a refrigeration unit for cooling and circulating air through the cargo bay, the space between the floor and the sub-floor defining a first duct through which air circulates thereby creating a first insulating layer for insulating product, and a plurality of generally rectangular product support platforms having four sides, each product support platform comprising:

a generally rectangular upper panel; and
a plurality of spacers depending from the upper panel for spacing the upper panel from the floor of the cargo bay, the spacers being arranged in spaced apart locations and defining passageways for air beneath the upper panel and above the floor between all of the four sides of the platform to permit the flow of air into any one of the sides between the upper panel and the floor and out all three of the other sides of the platform;

the platforms being arranged in a side-by-side relationship on the floor of the cargo bay with adjacent sides of the platforms generally in engagement with one another such that air is permitted to flow under the upper panels between all platforms in substantially all directions parallel to the floor, the space between the floor and the upper panels of the platforms and the floor of the cargo bay defining a second duct through which air circulates thereby creating a second insulating layer for further insulating product.

2. The combination as set forth in claim 1 wherein each product support platform further comprises a lower panel having at least one solid face, the spacers being attached to the lower panel at their lower ends such that the upper and lower panels are spaced from each other to permit the flow of air between the upper and lower panels.

3. The combination as set forth in claim 2 wherein the lower panel of each product support platform has a greater surface area than the upper panel of the product support platform and the upper and lower panels of the product support platform are arranged relative to one another so that at least one peripheral edge margin of the upper panel projects laterally outwardly from at least one peripheral edge margin of the lower panel whereby there is a gap between adjacent upper panels of support platforms arranged on the floor of the cargo bay to permit air to flow through the product and between the upper panels and lower panels of the platforms.

4. The combination as set forth in claim 2 wherein the lower panel comprises a sheet of cardboard having a solid outer face, a solid inner face and a corrugated middle liner spacing the inner face from the outer face.

5. The combination as set forth in claim 4 wherein the upper panel comprises a sheet of cardboard having a solid outer face, a solid inner face and a corrugated middle liner spacing the inner face from the outer face.

6. The combination as set forth in claim 5 wherein the cardboard sheet of the upper panel is made of at least 26 pound cardboard.

7. The combination as set forth in claim 1 wherein the spacers comprise a plurality of tubular members made of cardboard.

8. The combination as set forth in claim 7 wherein the tubular members lie in parallel rows, the spacers being constructed and arranged to create turbulence in the air flow between the upper and lower panels thereby to facilitate heat transfer from the product.

9. The combination as set forth in claim 8 wherein the number of tubular members in adjacent rows is unequal.

10. The combination as set forth in claim 9 wherein the number of tubular members in a first of the rows is five and the number in a second of the rows adjacent the first row is four.

11. A method for loading and cooling a perishable product which must be maintained at a cooled temperature, the method comprising the steps of:
providing a refrigerated cargo bay having a sub-floor and a floor spaced from the sub-floor, the space between the floor and the sub-floor defining a first duct, spaced apart side walls projecting upwardly from the floor and extending between a forward end and a rearward end of the cargo bay, and a refrigeration unit for cooling and circulating air through the cargo bay;
providing a plurality of product support platforms comprising a generally rectangular upper panel, a plurality of spacers depending from the upper panel for spacing the upper panel from the floor of the cargo bay, the spacers being arranged in spaced apart locations and defining passageways for air beneath the upper panel and above the floor between all of the four sides of the platform to permit the flow of air into any one of the sides between the upper panel and the floor and out all three of the other sides of the platform, the space between the floor and the platform defining a second duct;
arranging the platforms in a side-by-side relationship on the floor of the cargo bag with adjacent sides of the platforms generally in engagement with one another whereby air is permitted to flow under the upper panels between all platforms in substantially all directions parallel to the floor;
loading the product onto the platforms;
forcing cooled air from the refrigeration unit rearwardly over the product;
drawing the air forwardly such that the air passes through the first and second ducts under the product thereby providing first and second insulating layers for insulating the product from heat transfer through the floor of the vehicle;
introducing turbulence into the flow of air under the upper panels to facilitate the transfer of heat from the platforms and product to the air.

12. The method as set forth in claim 11 wherein the step of providing a product support platform further comprises the step of providing such a product support platform having a generally rectangular lower panel having peripheral edge margins, and wherein the step of arranging the platforms comprises the step of positioning the platforms on the floor of the cargo bay such that at least one peripheral edge margin of each lower panel engages a peripheral edge margin of the lower panel of an adjacent platform such that the lower panels of the platforms form a substantially continuous surface over the floor to retard heat transfer through the floor.

13. A system for supporting product which must be maintained at a cooled temperature in a cargo bay such as a cargo bay of a refrigerated transport having a floor and a refrigeration unit for cooling and circulating air through the cargo bay, the system comprising:
a plurality of product support platforms each comprising a generally rectangular upper panel, a plurality of spacers depending from the upper panel for spacing the upper panel from the floor of the cargo bay, the spacers being arranged in spaced apart locations and defining passageways for air beneath the upper panel and above the floor between all of the four sides of the platform to permit the flow of air into any one of the sides between the upper panel and the floor and out all three of the other sides of the platform;
the platforms being adapted to be arranged in a side-by-side relationship on the floor of the cargo bay with adjacent sides of the platforms generally in engagement with one another such that air is permitted to flow under the upper panels between all platforms in substantially all directions parallel to the floor, the platforms being adapted to insulate the product supported thereon from the floor of the cargo bay;
each product support platform further comprising a lower panel having at least one solid face, the spacers being attached to the lower panel at their lower ends such that the upper and lower panels are spaced from each other to permit the flow of air between the upper and lower panels;
the lower panel of each product support platform having a greater surface area than the upper panel of the product support platform and the upper and lower panels of the product support platform are arranged relative to one another so that at least one peripheral edge margin of the upper panel projects laterally outwardly from at least one peripheral edge margin of the lower panel whereby there is a gap between adjacent upper panels of support platforms arranged on the floor of the cargo bay to permit air to flow from through the gap.

14. The system as set forth in claim 13 wherein the lower panel comprises a sheet of cardboard having a solid outer face, a solid inner face and a corrugated middle liner spacing the inner face from the outer face.

15. The system as set forth in claim 13 wherein the spacers comprise a plurality of tubular members made of cardboard.

16. The system as set forth in claim 15 wherein the tubular members lie in parallel rows with the number of tubular members in adjacent rows being unequal, the spacers being constructed and arranged to create turbulence in the air flow between the upper and lower panels thereby to facilitate heat transfer from the product.

17. A method for loading and cooling a perishable product which must be maintained at a cooled temperature in a refrigerated cargo bay having a floor, spaced apart side walls projecting upwardly from the floor and extending between a forward end and a rearward end of the cargo bay, a top wall extending between the side walls and a refrigeration unit for cooling and circulating air through the cargo bay, the method comprising the steps of:
  providing a first air passageway in fluid communication with the cargo bay generally at the forward and rearward ends thereof for carrying cooled air from the cargo bay back to the refrigeration unit;
  providing a plurality of product support platforms comprising an upper panel, a plurality of spacers depending from the upper panel for spacing the upper panel from the floor of the cargo bay, the spacers being arranged in spaced apart locations and defining paths for air beneath the upper panel and above the floor between all sides of the platform to permit flow of air into any one of the sides between the upper panel and the floor and out all of the other sides of the platform;
  arranging the platforms in a side-by-side relationship on the floor of the cargo bay with adjacent sides of the platforms generally in engagement with one another whereby air is permitted to flow under the upper panels between all platforms in substantially all directions parallel to the floor, the space between the floor and the upper panel defining a second air passageway in fluid communication with the cargo bay generally at the forward and rearward ends thereof for carrying cooled air from the cargo bay back to the refrigeration unit, the second air passageway being located above the first air passageway in the cargo bay;
  loading product onto the platform in an arrangement which leaves a space between the product and the top wall of the cargo bay, the space defining a third air passageway for carrying cooled air from the cargo bay back to the refrigeration unit;
  forcing cooled air from the refrigeration unit toward one of the forward and rearward ends of the cargo bay;
  drawing the cooled air from said one end toward an opposite end of the forward and rearward ends of the cargo bay, the air traveling in the three air passageways from said one end of the cargo bay back to the refrigeration unit.

* * * * *